UNITED STATES PATENT OFFICE.

WILHELM PICKHARDT, OF NEW YORK, AND HERMANN ENDEMANN, OF BROOKLYN, N. Y., ASSIGNORS TO SAID PICKHARDT AND ADOLF KUTTROFF, OF NEW YORK, N. Y.

NEUTRAL TANNATE OF CHINOLINE.

SPECIFICATION forming part of Letters Patent No. 260,318, dated June 27, 1882.

Application filed May 3, 1882. (Specimens.)

*To all whom it may concern:*

Be it known that we, WILHELM PICKHARDT, a citizen of the United States, residing at New York, in the county and State of New York, and HERMANN ENDEMANN, a citizen of the United States, residing at Brooklyn, in the county of Kings and State of New York, have invented new and useful Improvements in Chinoline Compounds, of which the following is a specification.

This invention relates to a compound which is obtained by the action of tannic acid on chinoline.

In carrying out our invention we take the chinoline of Skraup, or prepare such chinoline according to the patent granted to Zdenko H. Skraup, May 17, 1881, No. 241,738, and then we free the same from the impurities mixed therewith by treating it with tartaric acid, whereby a tartrate of chinoline is obtained, and then we liberate from this salt the chinoline by treating its aqueous solution with caustic alkalies.

In preparing our new compound we take 62.4 pounds of tannic acid and twenty-six pounds of chinoline, or, in other words, about five pounds of tannic acid to two pounds of chinoline, and add thereto a very small quantity of water, the mixture being heated on a water bath and stirred until the water has evaporated. No more water should be taken than is necessary to thoroughly mix the substances. The result of this operation is a neutral tannate of chinoline, which is amorphous. It melts with boiling water and dissolves in it. It is separated from these solutions on cooling in oily drops, which become solid in the cold after standing. Its solutions cannot be evaporated without loss of chinoline. It is soluble in alcohol, but very little soluble in cold water.

The principal advantage of our new compound, particularly for medical purposes, is that by the addition of tannic acid to chinoline the peculiar odor of the chinoline is almost entirely destroyed.

What we claim as new, and desire to secure by Letters Patent, is—

As a new article of manufacture, the neutral tannate of chinoline having the properties above stated.

In testimony whereof we have hereunto set our hands and seals in the presence of two subscribing witnesses.

WM. PICKHARDT. [L. S.]
H. ENDEMANN. [L. S.]

Witnesses:
W. HAUFF,
E. F. KASTENHUBER.